United States Patent
Dauger

(10) Patent No.: US 7,136,924 B2
(45) Date of Patent: Nov. 14, 2006

(54) METHOD AND SYSTEM FOR PARALLEL OPERATION AND CONTROL OF LEGACY COMPUTER CLUSTERS

(76) Inventor: Dean Dauger, 3582 Venture Dr., Huntington Beach, CA (US) 92649

( * ) Notice: Subject to any disclaimer, the term of this patent is extended or adjusted under 35 U.S.C. 154(b) by 645 days.

(21) Appl. No.: 10/123,802

(22) Filed: Apr. 16, 2002

(65) Prior Publication Data

US 2003/0195931 A1  Oct. 16, 2003

(51) Int. Cl.
G06F 15/173 (2006.01)
(52) U.S. Cl. .................. 709/226; 709/204; 709/225
(58) Field of Classification Search ............... 709/223, 709/227, 205
See application file for complete search history.

(56) References Cited

U.S. PATENT DOCUMENTS

| | | | | |
|---|---|---|---|---|
| 5,944,779 A | * | 8/1999 | Blum | 709/201 |
| 6,009,455 A | * | 12/1999 | Doyle | 709/201 |
| 6,307,837 B1 | * | 10/2001 | Ichikawa et al. | 370/230 |
| 2001/0056461 A1 | * | 12/2001 | Kampe et al. | 709/201 |
| 2002/0087886 A1 | * | 7/2002 | Ellis | 713/201 |
| 2003/0005068 A1 | * | 1/2003 | Nickel et al. | 709/208 |

OTHER PUBLICATIONS

Perkins et al. "RFC 2165: Service Location Protocol." Jun. 1997. http://www.ietf.org/rfc/rfc2165.txt.*

* cited by examiner

Primary Examiner—Rupal Dharia
Assistant Examiner—Nicholas R. Taylor
(74) Attorney, Agent, or Firm—Steins & Associates, P.C.

(57) ABSTRACT

A Method and System for Parallel Operation and Control of Legacy Computer Clusters is disclosed. Also disclosed is a system that permits the creation of a cluster computer using the legacy operating systems already existing on the computing devices. The system is further be able to seamlessly operate over a standard wide are network, such as the "Internet," as well as over local area networks. The system further permits the individual computers to operate either as part of the cluster, or on local operations, without any need for modification to the other computers involved in the cluster. Still further, the system utilizes standard TCP/IP format for all internodal messaging. Finally, the system maintains performance "grades" for each cluster node, either by node self-grading, or by node reporting, such that the user can select which nodes to participate in a particular parallel application.

15 Claims, 12 Drawing Sheets

METHOD AND SYSTEM FOR PARALLEL OPERATION AND CONTROL OF LEGACY COMPUTER CLUSTERS

BACKGROUND OF THE INVENTION

1. Field of the Invention

This invention relates generally to parallel computing systems and, more specifically, to a Method and System for Parallel Operation and Control of Legacy Computer Clusters

2. Description of Related Art

Parallel computation, the use of multiple processors (both within one computing device as well as between networked computing devices) to solve large computational tasks, has been an objective of the industry for quite some time. In seeking to serve these large computational tasks, scientists have often written their own software code—this code was historically written specifically for parallel computers (i.e. computers having multiple processors). While these "parallel applications" functioned adequately (when constructed well, of course), their utility was limited to the particular task (and many times hardware) for which they were specifically written; changes in hardware and/or software requirements typically would require substantial, costly, software revisions. Furthermore, these applications were typically unable to be used on other computing devices.

Large parallel computers are typically located at major supercomputing centers, the hardware consists of large parallel computers (e.g. Cray T3E, IBM SP, Fujitsu, etc.), the software is commonly proprietary vendor software (many time a Unix variant). These "supercomputers" are managed by large staffs of professional administrators, and the majority of their operations are not accessible directly by individual users (except through the administrators).

As personal computers led the hardware and software evolution to where substantial computing power became attainable by the individual, systems known as "Clusters" became prevalent. Computer clusters are a, type of parallel computation system where a network of computing devices' processors are tightly coupled to share computation tasks in parallel fashion. An early and fairly prevalent version of a cluster computer is the "Beowulf" system first assembled at a NASA site to solve Earth Sciences problems (NASA Goddard Space Flight Center). The Beowulf cluster is characterized by a set of personal computers connected by specialized network hardware and running a specialized version of the open-source Linux operating system.

A Beowulf class cluster computer is distinguished from a Network of Workstations by several subtle but significant characteristics. First, the nodes in the cluster are dedicated to the cluster in order to "ease load balancing problems," by removing any external factors from affecting the performance of individual nodes. A second characteristic of these systems is that the interconnection network is isolated from any external network such that the network load is determined only by the application being run on the cluster. Along with this architecture, all the nodes in the cluster are within the administrative jurisdiction of the cluster. Since there is no external network access or participation, there is no need (or provisions for) network security.[1]

[1]http://www.beowulf.org/intro.html
[2]http://www.webopedia.com

While proponents of Beowulf systems (running on Linux operating systems) assert that they are extremely user-friendly to run parallel applications, it seems apparent that the clusters themselves are anything but simple to design and construct. In fact, it has been observed that at least two Beowulf clusters required approximately six months each to construct. Furthermore, the need for the computers to be captured (i.e. totally dedicated to use as a member of the cluster) in order to be a part of the cluster eliminates the possibility of making use of existing legacy networked computers.

If we turn to FIG. 1, we can review the general structure of a conventional (or legacy) computing device, such as a personal computer, so that we might next analyze how such a computing device might be modified in order to become part of a Beowulf cluster. FIG. 1 is a block diagram of pertinent functional components of a conventional computing device 10.

As shown, the computing device 10 comprises one or more processors 12 for performing the computations that are the essence of the function for which the computer 10 is used. The device 10 will also include a conventional operating system 14 for controlling the computer's operation. In communication with (or at least controlled by) the operating system are one or more input-output sub-systems, such as a video monitor, a keyboard, a network portal, etc. Another important module controlled by the operating system 14 is the memory 18. It is in the memory 18 (in this case random access memory, or RAM) that software applications reside while they are being executed; of course the memory 18 is closely coupled with the processor(s) 12.

To say that a software application such as any of 20A–20C is being executed on the computing device 10 is to actually say that the calculations that make up the applications are being operated upon by the processor(s) 12. In the case of the typical application 20, the operating system 14 is the "translator" between the application 20 written in a so-called high level language and the processor(s) 12, although in the case of applications written in "machine language," such as 20C, the application 20C interfaces directly with the processor(s). The operating system 14, although heretofore described generally, actually includes a critical component known as the "kernel."

The kernel is the central module of an operating system 14. It is the part of the operating system 14 that loads first, and it remains in main memory 18. Because it stays in memory 18, it is important for the kernel to be as small as possible while still providing all the essential services required by other parts of the operating system and applications. Typically, the kernel is responsible for memory management 26, process and task management 22, I/O management 24 and disk management.[2] In order to better understand the nuances of the present invention, the kernel is represented here as being discrete components responsible for the various functional areas of the operating system 14; in fact, only a single kernel is run on a particular machine at a particular time. If we now turn to FIG. 2, we can examine one of the drawbacks of the prior methods and systems for creating cluster computers.

[1]http://www.beowulf.org/intro.html
[2]http://www.webopedia.com

FIG. 2 is a block diagram of pertinent functional components of a conventional computing device 11 as it would be modified for operation as a node in a cluster computer under the prior art. In order for the cluster node control and interface software application 20D to be able to operate on the conventional computing device 11 to give control of its processor(s) 12 to another computing device (which is necessary to cluster compute), it has always been necessary, at the very minimum, to replace the original operating system with a modified operating system 15. The new operating system 15 is specifically designed to provide a kernel having the new functionality necessary to permit the cluster node control and interface application to offer the device's processor(s) up for control by an external computer (i.e. the control computer in the cluster).

This new kernel will typically require a revised CPU kernel 22A to provide the cpu-sharing capability, a revised I/O kernel 24A to exchange job messaging with the external computer(s), and a revised memory kernel 26A to provide control, monitoring and access to the device's memory 18 to external computers. There are at least two problems with replacing the original operating system with a special-purpose operating system: (1) there is a much higher likelihood of instability in the operating system due to conflicts and/or errors, and (2) the revised operating system is unlikely to maintain its original functionality—this means that the device 11 would not be suitable for general use any time the modified operating system is "booted." The result of this loss of original functionality is that the cluster will not be able to capitalize on existing (even idle) computer resources—the systems must be dedicated to the cluster and nothing else.

What is needed is a cluster node control software application that can operate with an existing, conventional or legacy operating system to provide shared processor resources to external computers in order to create a cluster computer without the need for computing resources dedicated to this task.

SUMMARY OF THE INVENTION

In light of the aforementioned problems associated with the prior systems and methods, it is an object of the present invention to provide a Method and System for Parallel Operation and Control of Legacy Computer Clusters. The system should permit the creation of a cluster computer using the legacy operating systems already existing on the computing devices. The system should further be able to operate over a standard wide are network, such as the "Internet," as well as over local area networks, seamlessly. The system should further permit the individual computers to operate either as part of the cluster, or on local operations, without any need for modification to the other computers involved in the cluster. Still further, the system should utilize standard TCP/IP format for all internodal messaging. Finally, the system should maintain performance "grades" for each cluster node, either by node self-grading, or by node reporting, such that the user can select which nodes to participate in a particular parallel application.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Method and System for Parallel Operation and Control of Legacy Computer Clusters.

Figure 1:
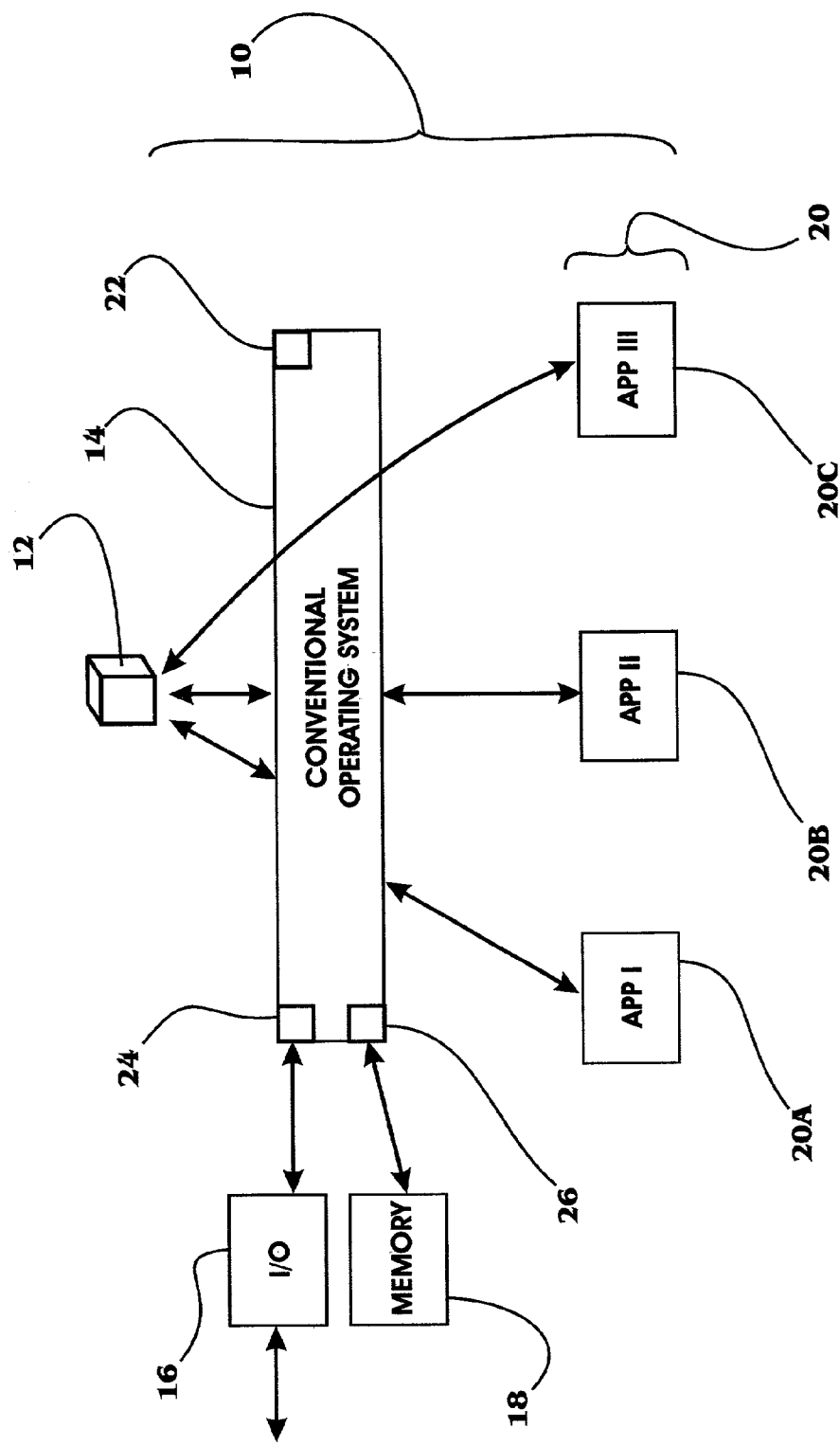
FIG. 1 is a block diagram of pertinent functional components of a conventional computing device.
Figure 2:
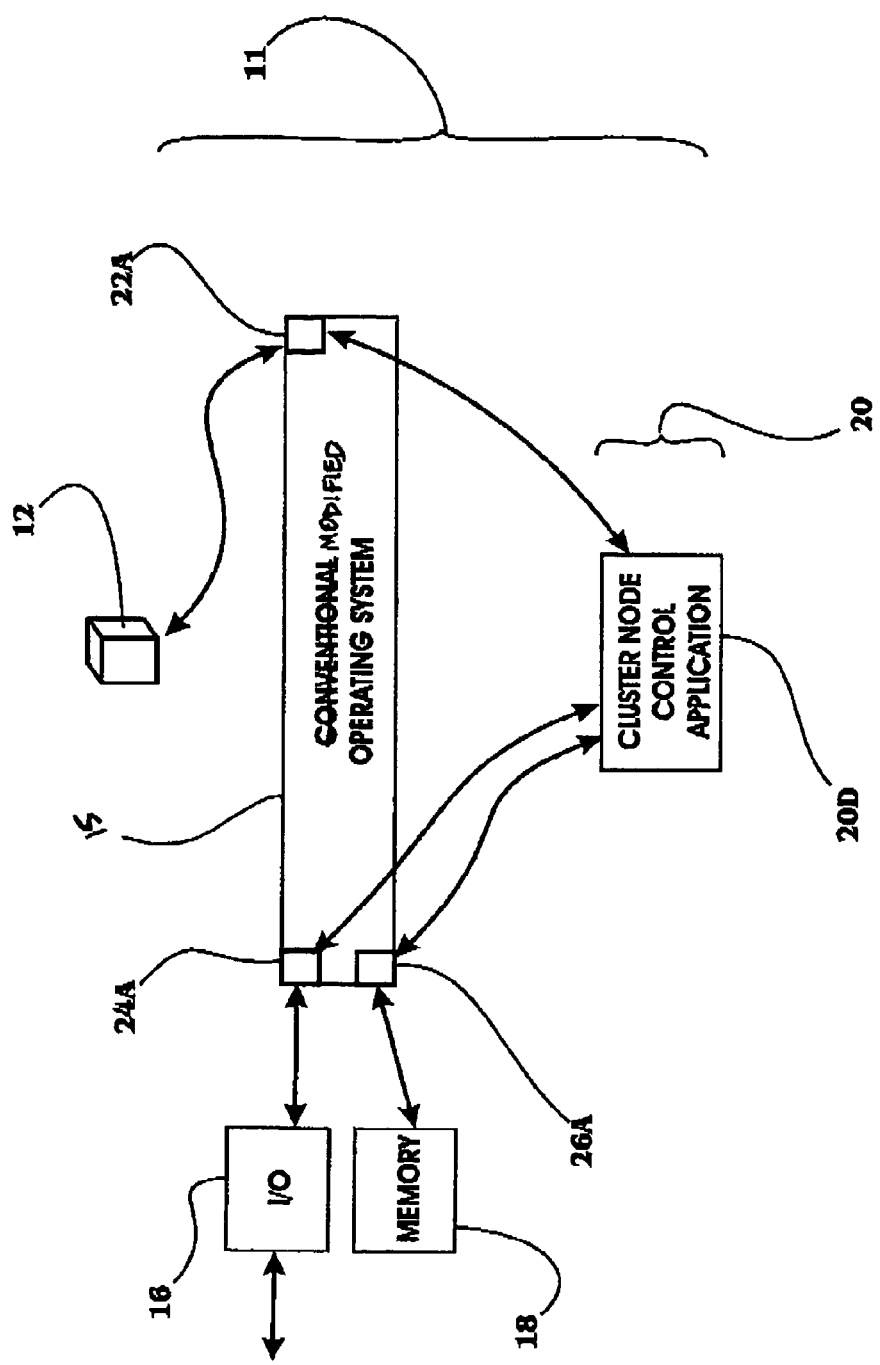
FIG. 2 is a block diagram of pertinent functional components of a conventional computing device as it would be modified for operation as a node in a cluster computer under the prior art.
Figure 3:
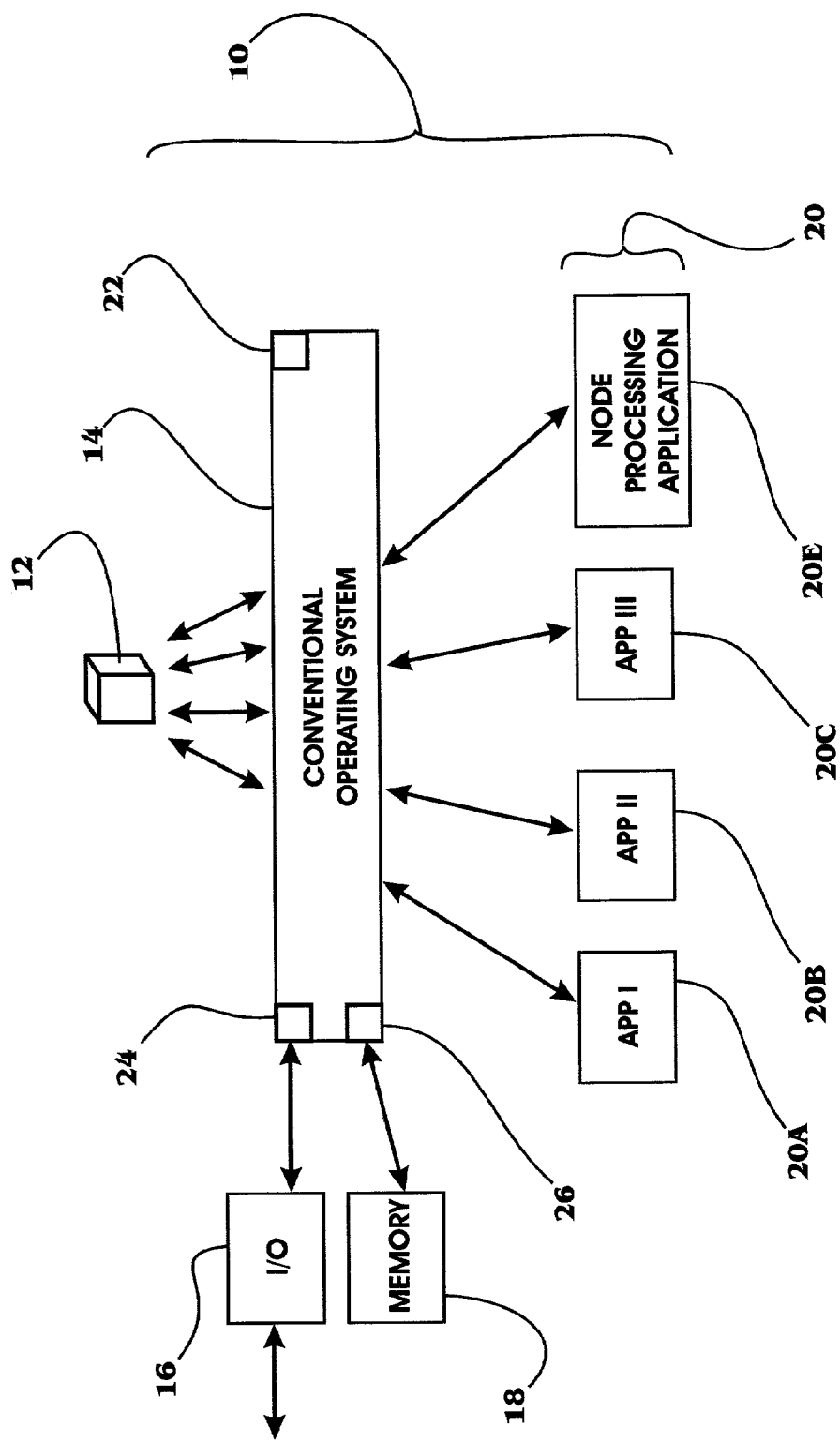
FIG. 3 is a block diagram of pertinent functional components of a conventional computing device as it would be modified for operation as a node in a cluster computer under an embodiment of the method and system of the present invention.

The present invention can best be understood by initial consideration of FIG. 3. FIG. 3 is a block diagram of pertinent functional components of a conventional computing device 10 as it would be modified for operation as a node in a cluster computer under an embodiment of the method and system of the present invention. It should be apparent that with the exception of the cluster node control and interface application 20E, all of the components of the device 10 are identical to those found above in FIG. 1. As such, the device 10 will be fully functional as a legacy device, while also enabling the processor(s) 12 to be shared with external computers (or to "borrow" the processor(s) from external computers if the present device 10 were "node 0," or the computer controlling the cluster). Since the operating system 14 has remained the same, the CPU kernel 22, I/O kernel 24 and memory kernel 26 are all just as they were prior to the installation of the application 20E. If we examine the process of FIG. 4, we can understand how each node of a cluster computer might be created using the present invention.

Figure 4:
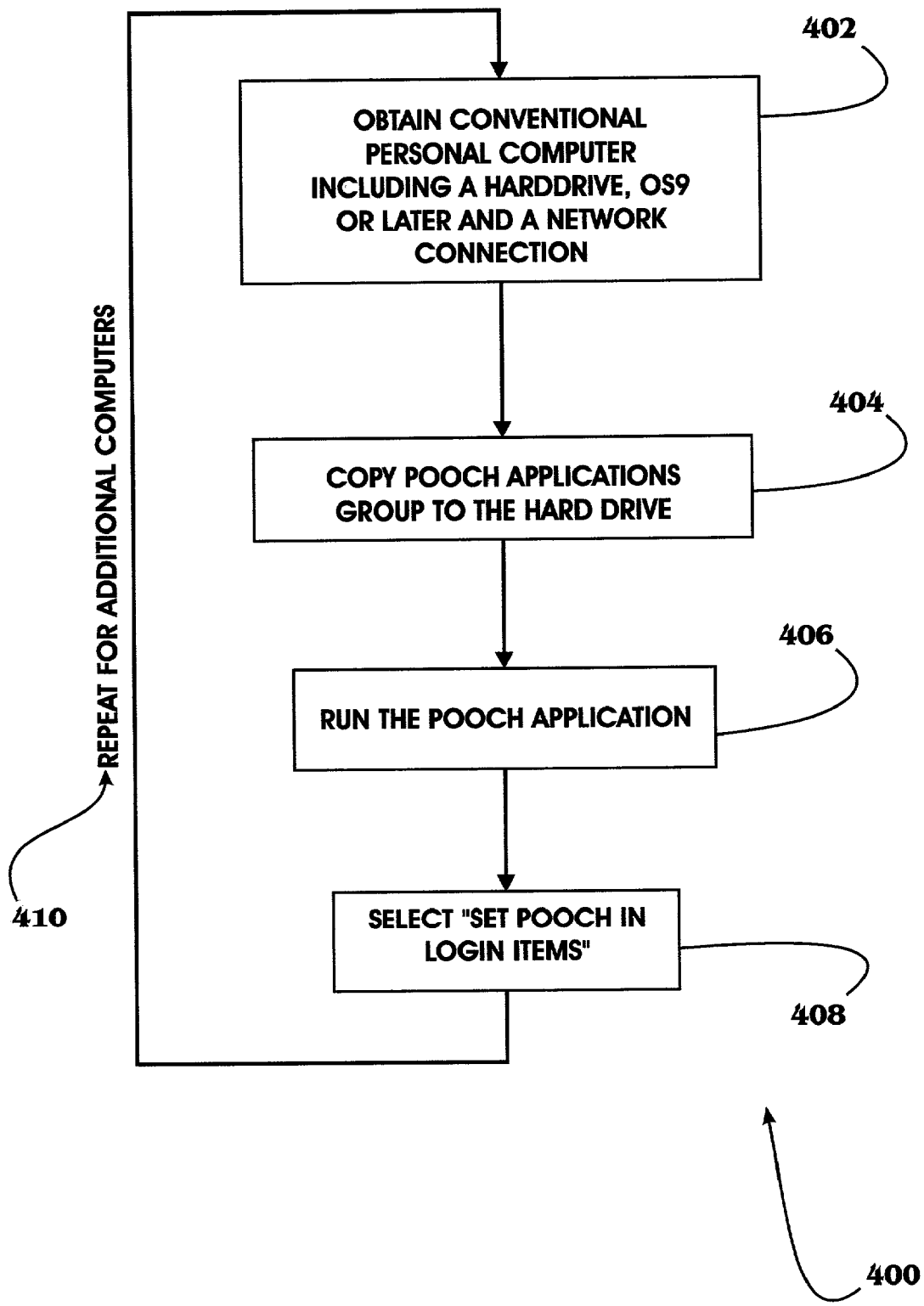
FIG. 4 is a flowchart depicting an embodiment of the method of the present invention for converting a legacy computing device to a cluster-enabled computing device.

FIG. 4 is a flowchart depicting an embodiment of the method 400 of the present invention for converting a legacy computing device to a cluster-enabled computing device. The initial step 402 includes obtaining a personal computer; the computer must be fully functional and include (in addition to those components discussed above in connection with FIG. 3) a hard drive and a network connection. The operating system must provide a standard protocol for discovery of network services; a suitable example could be Apple Computer's Macintosh OS 9.0 or later wherein TCP/IP-based Services Location Protocol (SLP) libraries are maintained inside of the Apple Network Services Location Manager (NSLM) for discovery of other nodes over IP-based networks. It is expected that a network built from nodes having a standard network service discovery protocol will operate perfectly as described herein. It should be noted that, unlike the Beowulf systems described previously, there is no need for the operating system to maintain a library of the nodes in a cluster (or proposed cluster); as will be discussed further below, the node library is a dynamic list, rather than a fixed library. In other embodiments of the present system, a program (and process) module for discovering network services may be found; this module would be particularly desirable where the operating system does not include functionality such as the SLP and NSLM.

The next step 404 involves the copying of the cluster node control and interface (CNCI) group (of software applications) to the personal computer's hard drive. Next 406, the CNCI main application is executed. Finally 408, the CNCI application is set to start (in background) each time that the computer (and operating system) is started.

Figure 5:
FIG. 5 is three sequential "screen shots" of the installation process for one embodiment of the present invention on a proposed node in a cluster.
Figure 5:
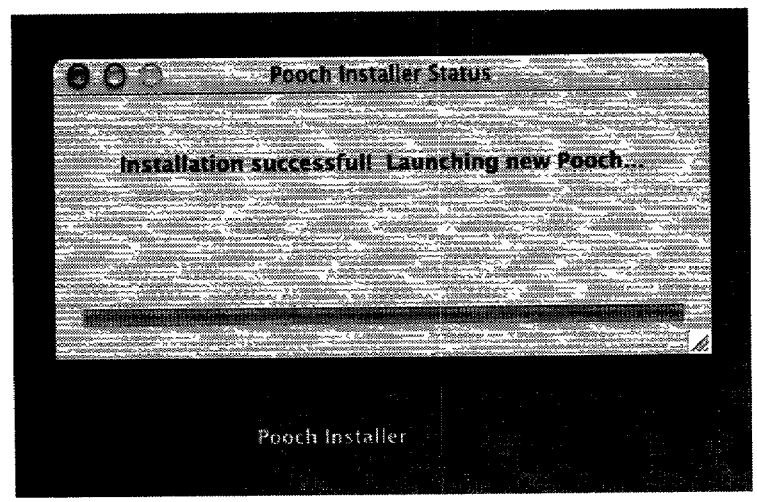
Figure 5:
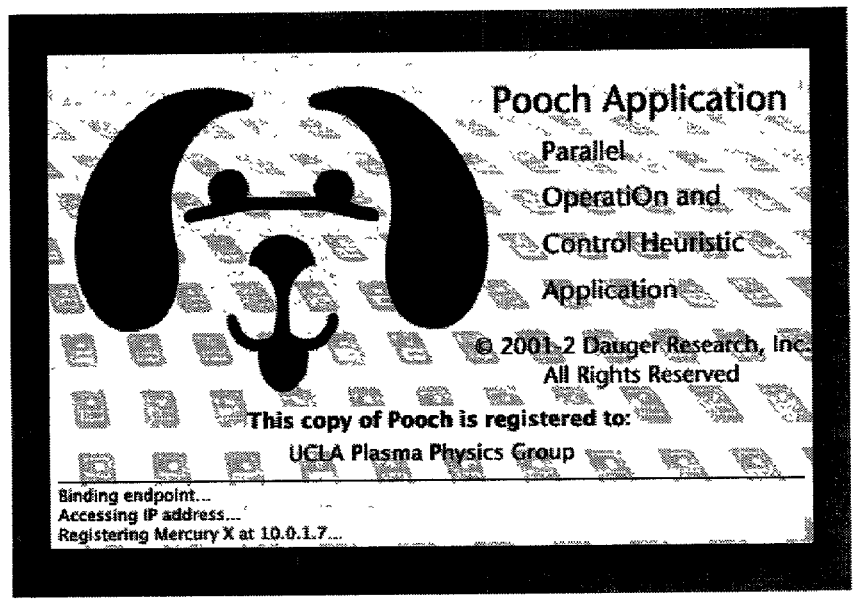

In order to create a computing cluster, the aforementioned steps are 410 repeated on additional computing devices similarly configured, and having network connectivity (as will be discussed more fully below). FIG. 5 is three sequential "screen shots" of the installation process for one embodiment of the present invention on a proposed node in a cluster.

Figure 6:
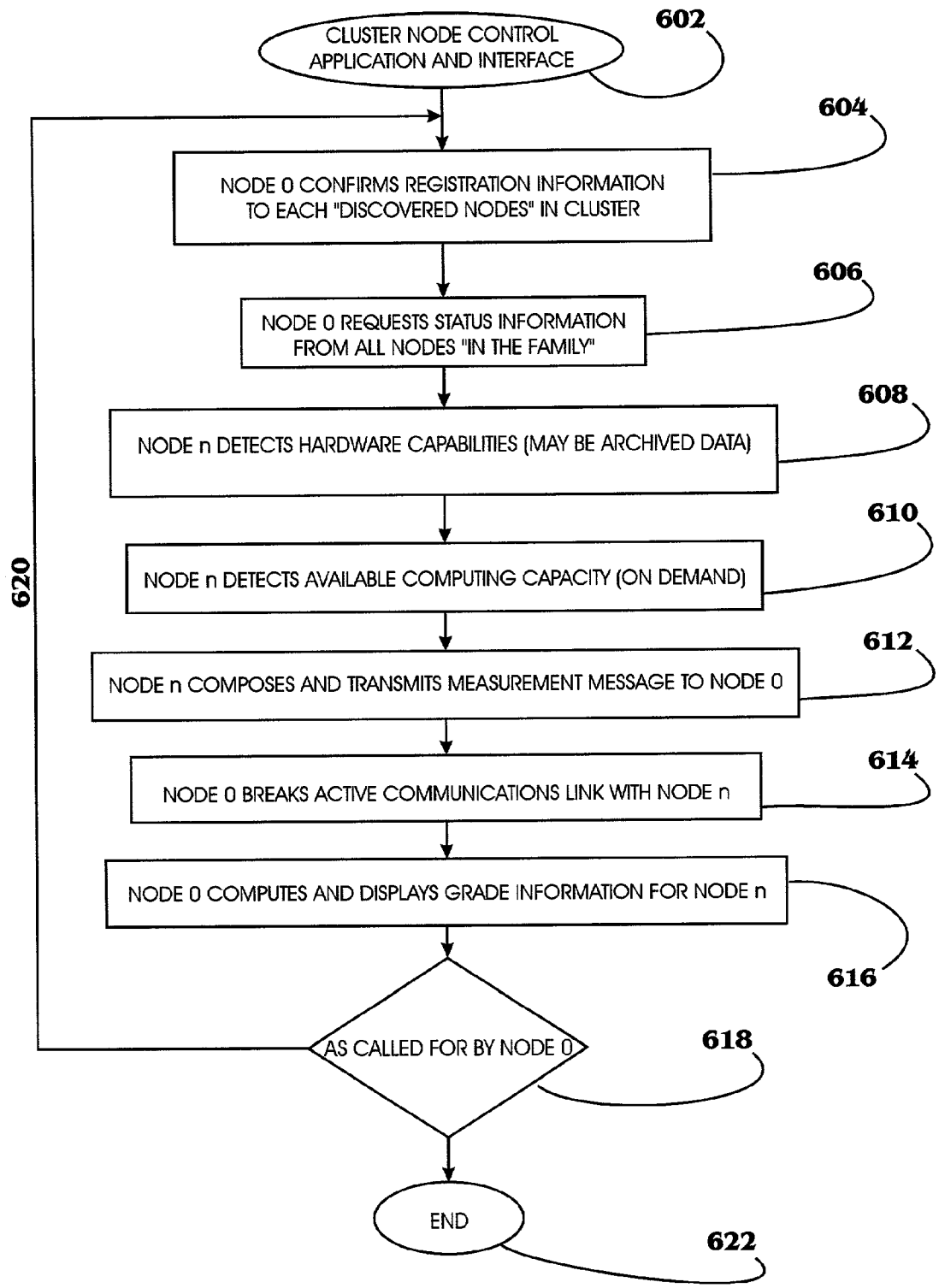
FIG. 6 is a flowchart depicting an embodiment of the method of the present invention wherein a cluster node is graded.

If we now refer to FIG. 6, we can examine how the node control process of the present invention operates to optimize the selection of nodes for participation in a parallel computation. FIG. 6 is a flowchart depicting an embodiment of the method 600 of the present invention wherein a cluster node provides its status and/or grades itself.

After the CNCI application is started 602 (such as when the computer is started up), Node 0 begins the status-reporting process by sending a registration confirmation message 604 to all nodes that is "discovers," such as via the aforementioned SLP capability. Next, Node 0 sends a broadcast message requesting status information from all nodes "in the family" 606 (see the discussion in connection with FIG. 10 to understand the adding of a node to "the family"). The CNCI family is a group of computers registered into the same cluster for the purposes of creating a cluster computer. Next, the computer detects its hardware capabilities 608, such as memory size and processor speed (this is inherent capabilities data, and may be stored in an archived file). Next, the computer's available computing capacity is detected 610, such as the available processor capacity and the available memory. Next 612, Node n composes and transmits a message to Node 0, wherein the message content are the results of measurement steps 608 and 610. It should be understood that in other embodiments steps 604, 606, 608, 610 and 612 might be modified, for example, step 610 might include the computer actually computing a grade for itself based upon the data of steps 608 and 610. Furthermore, the message of step 612 might contain the measurement results, the grade computation, or both (or either). Upon receipt of the measurement message of step 612, Node 0 breaks the active communications link with Node n 614. Next, Node 0 computes (or simply displays) the grade information based upon the reported measurements 616; where self-grades are reported to Node 0, Node 0 may elect to use those grades and/or to compute its own grade for the purpose of monitoring the cluster's status.

When desired by Node 0 (this could be automatic, or on-demand) 616, the process is either repeated 620, until the CNCI application at Node n is halted 622. Since the CNCI application can be run in the background while a user conceivably is using the computer for other tasking (i.e. other than computing in the cluster), it should be understood that the computing capacity will not be a constant, and therefore the performance grade will also be variable depending upon loading.

In another embodiment, each Node n may, on a periodic basis (i.e. on set time intervals), conduct steps 608–612 on its own (without being commanded by Node 0).

By periodically sending the grade message (and being successfully authenticated as part of the family of nodes), the CNCI application has "registered a URL" and is now visible on the network (i.e. as a cluster resource); this mandates that the CNCI application run on all nodes at all times that the computer is running, often in the "background." The CNCI application can be easily brought to the foreground when the user desires to query the status of a parallel job, the cluster in general, or to actually launch a parallel job. If we now turn to FIG. 7, we can examine how a particular node in the cluster might be included in a parallel processing job.

Figure 7:
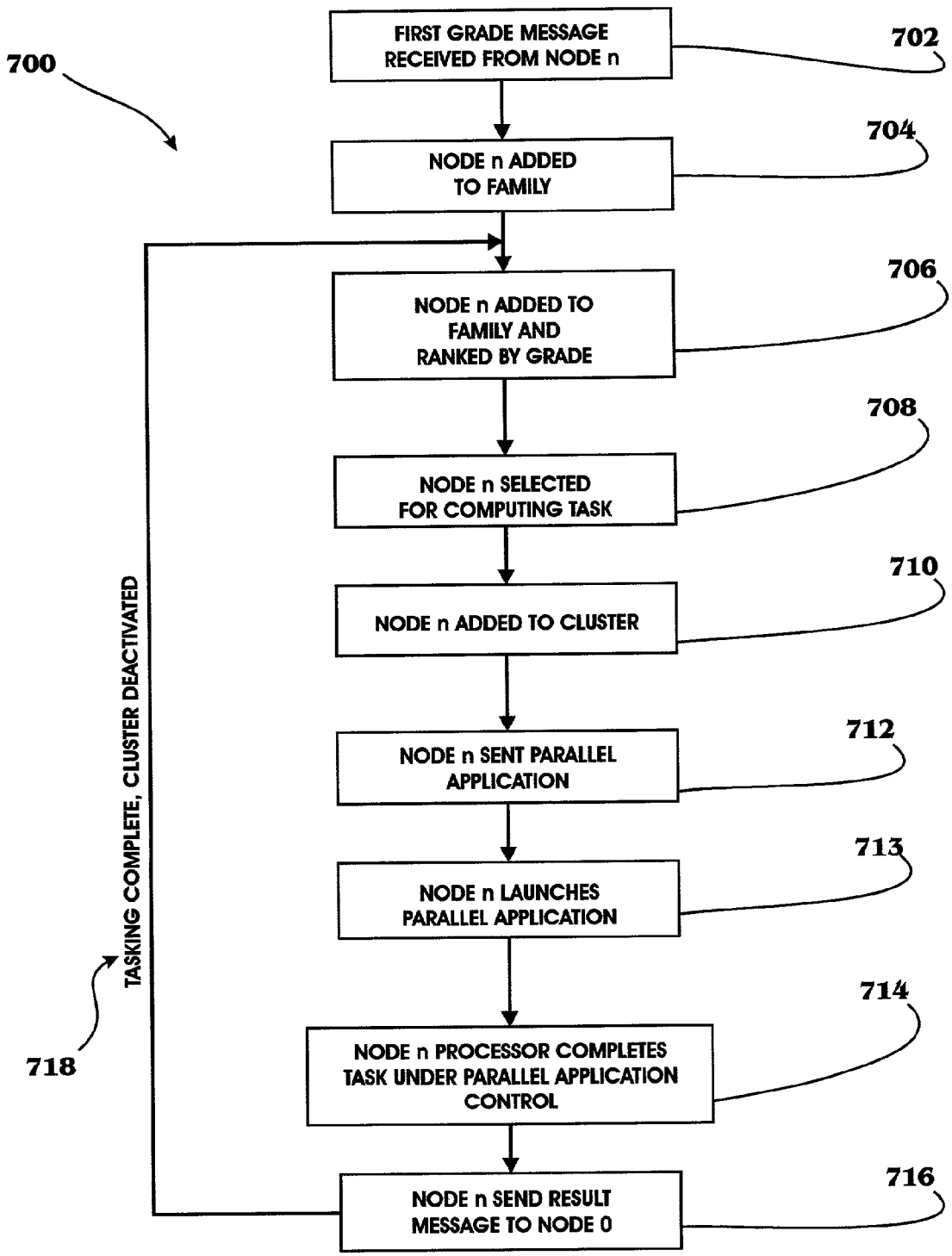
FIG. 7 is a flowchart depicting an embodiment of the method of the present invention for a node to be included in a parallel processing task.

FIG. 7 is a flowchart depicting an embodiment of the method 700 of the present invention for a node to be included in a parallel processing task. It should be understood that this method is executed on the computer that we have been referring to as "Node 0." Node 0 is the computer that actually controls the queuing and launch of the parallel processing jobs on the cluster computer. Although we have been referring to Node 0 as if it was fixed as being a single computing device, in reality, any computer in the cluster can act as Node 0 if the user at that Node chooses.

Regarding message encryption, each message that is sent between nodes in the present system is encrypted, such as by a 512-bit encryption technique. Furthermore, the encryption key rotates for each message, and is based upon a unique identification for the particular family to which the node(s) belong. Since the encryption key changes for each message, cluster security over a non-secure network is sound.

After receiving the first grade message (in standard network messaging format, with the encryption discussed above) from Node "n" 702 (where n represents the node's arbitrary number), that Node is added to the "family" 704. A "family" member is any Node that has the proper registration number for a particular cluster, and that is turned on and ready for job tasking (capacity-permitting, of course). Once added to the family, Node n is ranked by its grade 706. Once given a rank, Node n may be selected for a particular computing task 708. The specific interface steps involved in selecting Node n for a task will be discussed more fully below in connection with other figures.

When selected for a computing task, Node n is "added to the computing job" 710, meaning it is one processing component in the job about to be performed by this cluster computer. The CNCI application running at Node 0 launches a job by copying the parallel application (to be run) from Node 0 to the selected Nodes 712 (upon passcode approval and encryption exchange, discussed above), after which the CNCI applications at each Node complete the job launch by each launching its copy of the parallel application 713 (in the sequence mandated by the parallel application itself), after which communications or network connections are established between the nodes in the environment of the parallel application. This passes control of all computing nodes to the parallel application, and the CNCI runs in the background to minimize its impact on the parallel application's performance.

Once the parallel application is executing (in the cluster), it uses the processors and network connections, as is appropriate for the particular parallel application. The pattern of computation and communication is application-specific. For example, Node 0 (where the original copy of the parallel processing application resides) can send out one or more task message(s) to the selected Nodes, after which each Node n completes its discrete task (sharing information or intermediate results with other nodes, as required) 714. Upon completion of its respective task, Node n sends a result message to Node 0 716 (in the format discussed previously, including encryption, if desired).

In another example, it is known that other parallel applications compute in a peer-to-peer arrangement as well as between the Node n's and Node 0. The CNCI is capable of operating with both example parallel application forms.

Figure 8:
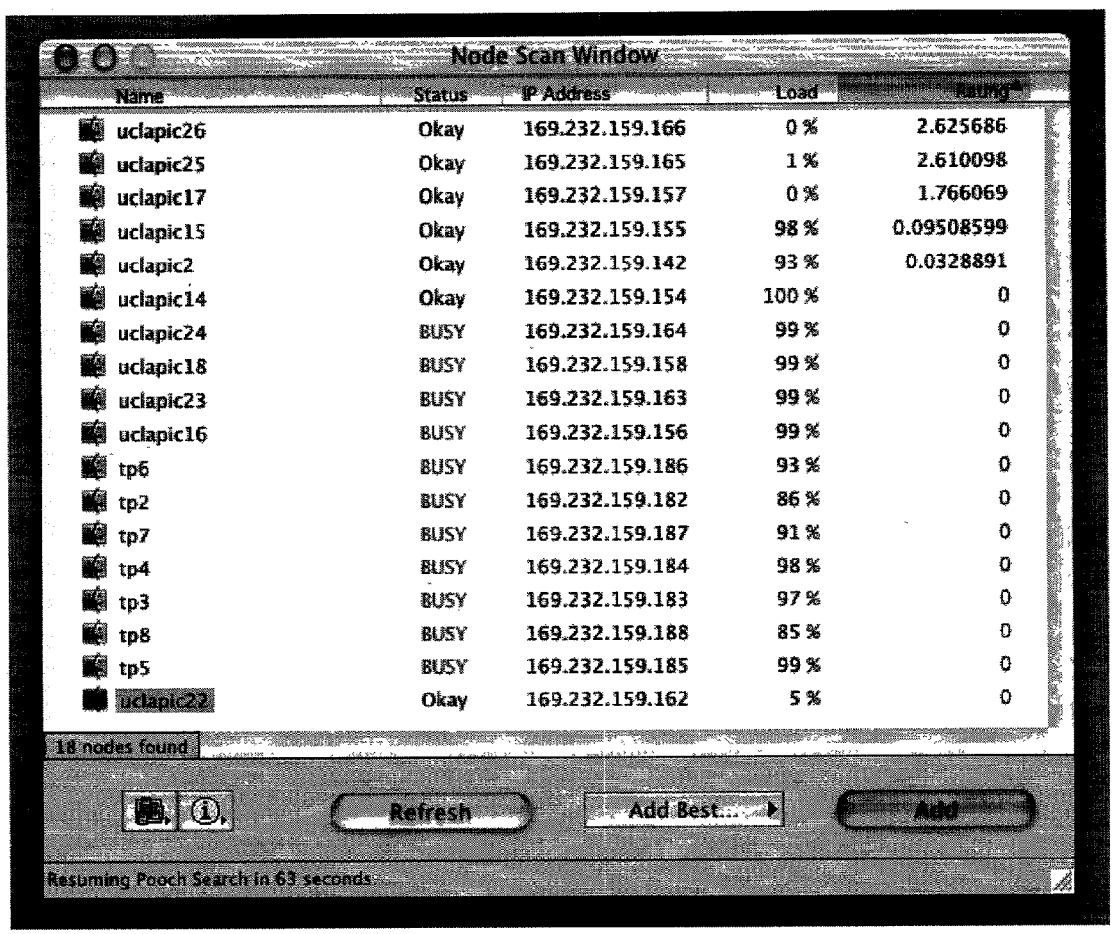
FIG. 8 depicts a "screen shot" of an embodiment of the invention during the node task inclusion process.

Once the tasking by the parallel application is complete, the parallel application shuts down its network connections and ceases execution. The CNCI application is then free for the user to select a new application to be run in parallel processing mode—the cluster is deactivated 718 until such time as a new application is to be run in parallel processing mode—at that time the Nodes will be queried for their grades and they will be ranked accordingly 706. FIG. 8 depicts a "screen shot" of an embodiment of the invention during the node task inclusion process.

In fact, the CNCI application on any of the Nodes can be invoked to query the status of the computing clusters Nodes during the execution of the parallel application. Operation of the CNCI application, directly or remotely on another Node, can be performed as the parallel application is executing, but such queries may temporarily degrade computation and network performance. In any case, it is possible to use this information to choose nodes that are not currently running an application (i.e. for new tasking). If we examine FIG. 9, we can see how an example of how nodes in the cluster of the present invention might interconnect to one another.

Figure 9:
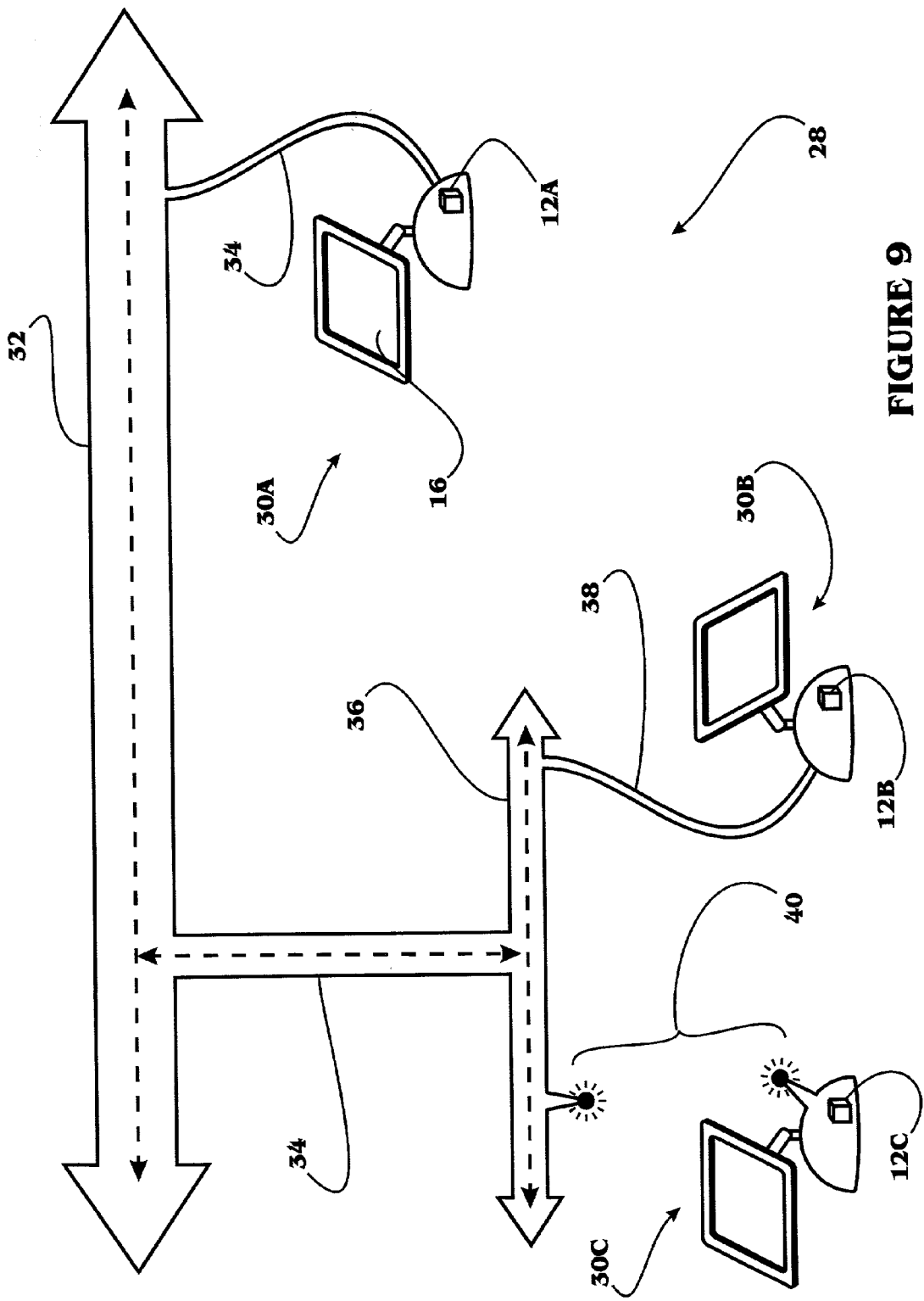
FIG. 9 depicts an embodiment of a 3-node cluster computer of the present invention.

FIG. 9 depicts an embodiment of a 3-node cluster computer of the present invention 28. Starting with the first computing device 30A, we can see that it comprises a processor 12A and a user interface 16 (shown for aesthetics only). It is understood that the previously-mentioned CNCI applications are running in the background of each of the computing devices to be discussed. The first computing device 30A is connected to a Wide Area Network Conduit 32 (e.g. the world wide web or "Internet") via a WAN connectivity conduit 34. The WAN connectivity conduit is virtually any conventional hardware system for connecting to a wide area network.

The second computing device 30B, comprising a processor 12B is connected to a Local Area Network Conduit 36 via a LAN connectivity conduit 38. The LAN connectivity conduit is virtually any conventional hardware system for connecting via wire to a local area network. The Local Area Network Conduit 36, in turn, is connected to the Wide Area Network Conduit 32 via a WAN connectivity conduit 34. In this manner, there is communications connectivity between the first computing device 30A and the second computing device 30B.

The third computing device 30C, also comprising a processor 12C is connected to the Local Area Network Conduit 36—in this case by a WIRN Connectivity Conduit 40, such as via RF or even Infrared or other conventional system for wirelessly connecting to a local area network.

Since the system and method of the present invention use standard operating systems, standard messaging protocols, and robust encryption methods for security, it should be apparent that the power and flexibility of the present invention is immense. In particular, virtually any computing device that is network-capable, has the necessary standard operating system installed, and executes the CNIC application can participate in a computing cluster.

The present system can operate over the World Wide Web (and other wide-area networks). From any connection to the WAN, it is possible for all functions of the system to operate on any other computer running the cluster node application. Although discovery using Services Location Protocol is limited to local networks, a remote node can be commanded to discover other nodes on its local network, after which these remote nodes (discovered locally by SLP) can be added to the cluster for tasking. The implication is that existing computer networks can provide added functionality that was not previously available without hardware or operating system modification! By reviewing FIG. 10, we can understand how nodes are included in the family in the system of the present invention.

Figure 10:
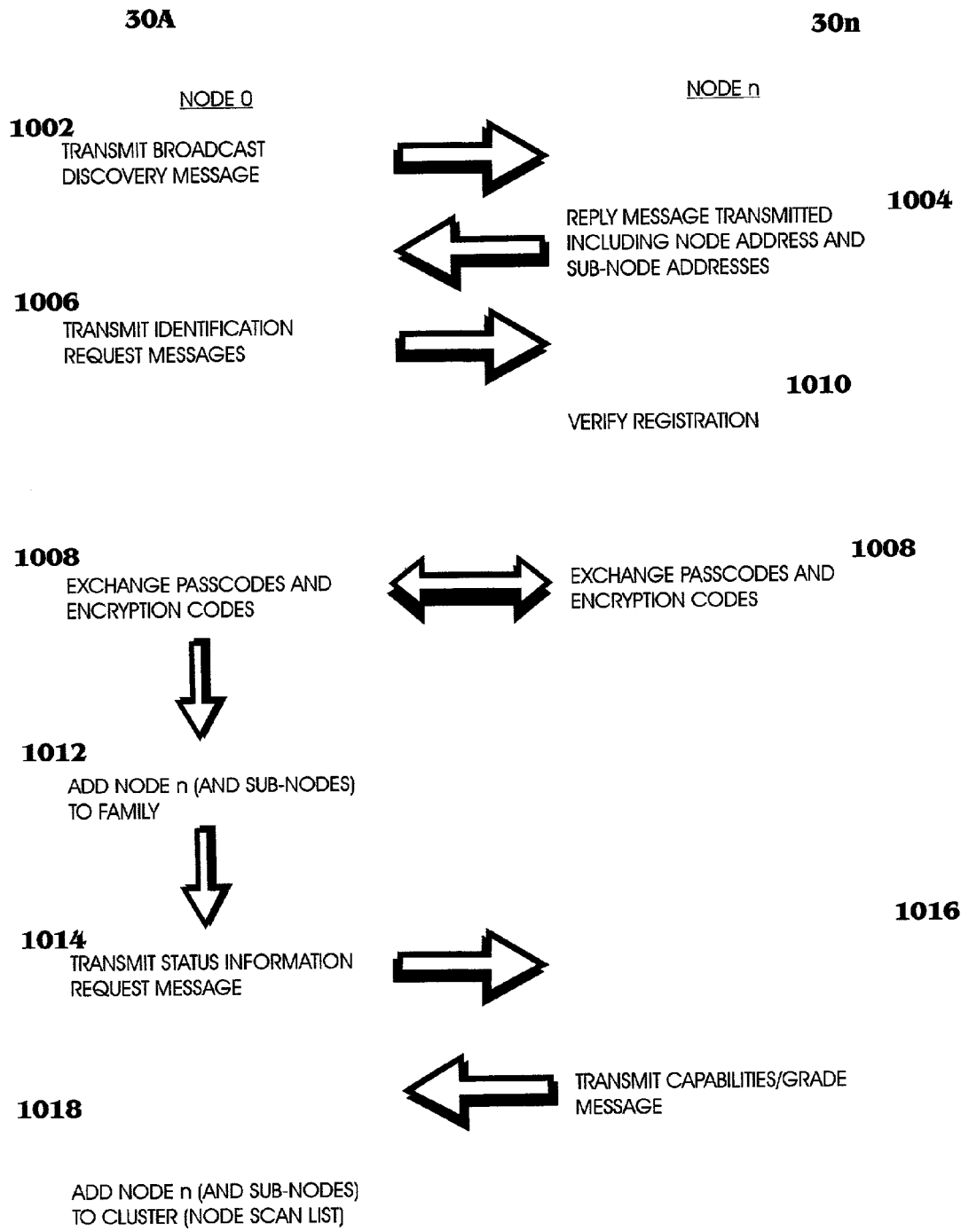
FIG. 10 is a flow diagram depicting an embodiment of the node family inclusion process of the present invention.

FIG. 10 is a flow diagram depicting an embodiment of the node inclusion process 1000 of the present invention. The left-side column of the drawing depicts those actions being conducted by Cluster Node 0 30A in the process 1000; the right-side column depicts those actions being conducted by another (slave) Cluster Node, called Node n 30N.

Figure 11:
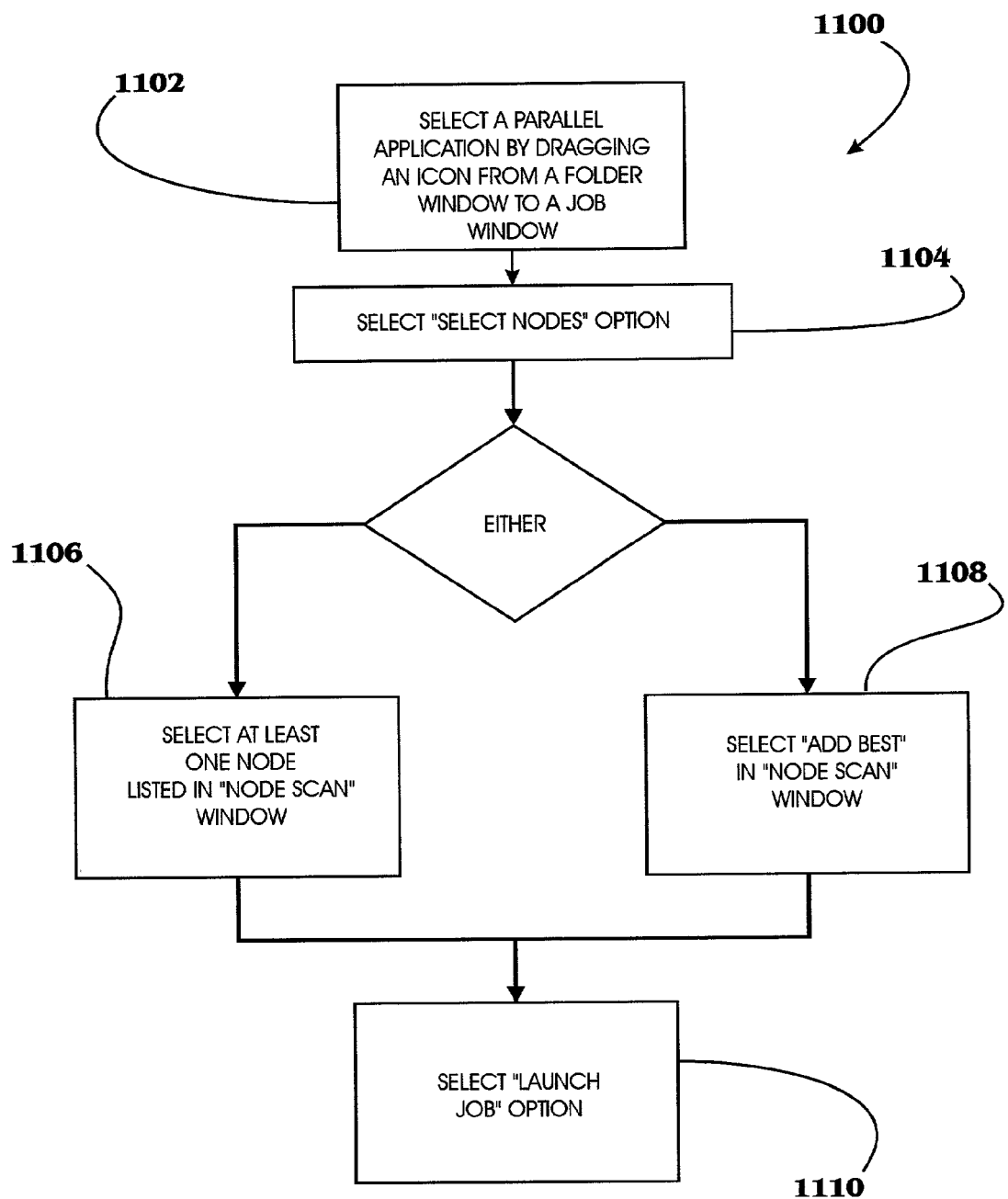
FIG. 11 is a flowchart of an embodiment of the I/O interface process to launch an application on a cluster computer of the present invention.

Now turning to FIG. 11, we see a flowchart of an embodiment of the I/O interface process 1100 to launch an application on a cluster computer of the present invention. The steps in this process should be viewed in combination with the representation of the user screen interface shown below in FIG. 12.

First, the user selects a parallel application for execution by "dragging" an icon from a "folder" window to a "job" window 1102. Next the user selects "select nodes" option 1104. Next, the user either: selects at least one node listed in the "node scan window" 1106, or selects "add best" in node scan window 1108. Finally, the user selects "launch job" option 1110. Certainly, it should be apparent that the job launching process of the present invention is extremely efficient, intuitive, and easy to administrate—none of these attributes apply to the prior art parallel computing systems.

Furthermore, in order to prevent "bottlenecks" or overloads, the system maintains a queue of parallel jobs; if a parallel job is running, the next job could be held from operation until the first job has been completed. Also, the launch of the parallel application could be set for a particular time, such as when computer resources are generally idle.

Figure 12:
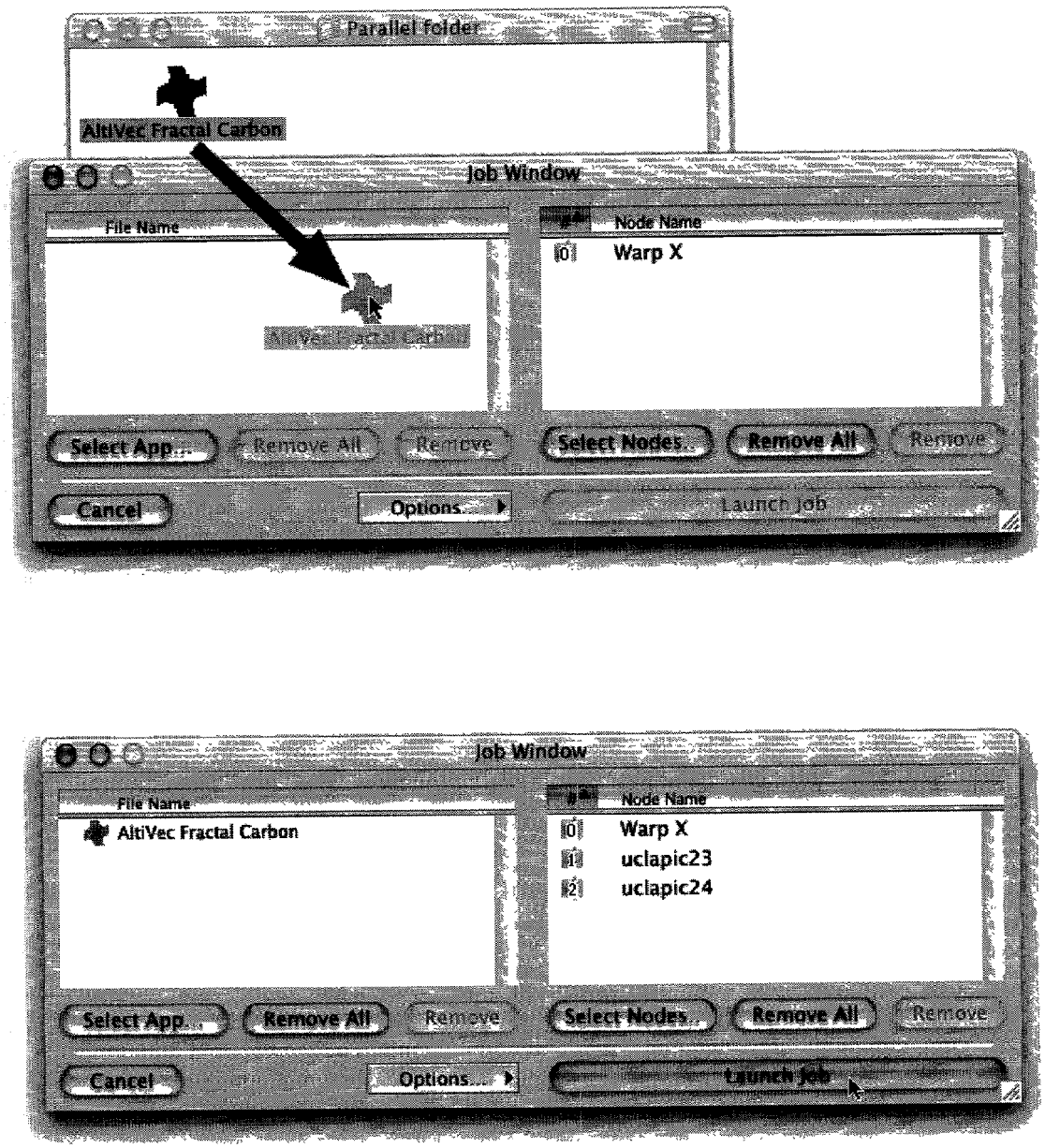
FIG. 12 is a pair of "screen shots" of the launching of a parallel application using the system of the present invention.

FIG. 12 is a pair of "screen shots" of the launching of a parallel application using the system of the present invention.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method of providing a cluster computer, the method being implemented in at least two programmed computers, in a peer relationship each said programmed computer comprising a processor, a standard operating system, at least one data storage system, at least one input device, at least one output device, and at least one external network interface, said network interfaces of all said computers interconnecting said programmed computers over a communications network, the method comprising the steps of:
- a copying node control applications groups comprising applications defined by executable statements to said data storage systems of each said programmed computers; and
- executing a node control application, said application a member of said group on each said programmed computer;
- composing a grade message in one said programmed computer; and
- transmitting said grade message front on said computer to another said computer over said network,
- wherein none of said copying, executing, composing or steps modify or require modification to said standard operating systems.

2. The method of claim 1:
- further comprising the step of a first detecting prior to said composing, said first detecting comprising one said programmed computer detecting the size of said storage system and the speed of said processor; and
- wherein said composing comprises composing a grade message responsive to said first detecting.

3. The method of claim 2,
- further comprising a user input step prior to said composing step, said user input step comprising a user inputting family registration information; and
- wherein said composing further comprises said composing being responsive to said family registration information.

4. The method of claim 3,
- further comprising a second detecting step after said first detecting step, said second detecting comprising said one computing device detecting the amount of available processing capacity remaining in said processor and the amount of available memory capacity remaining in said storage system; and
- wherein said composing further comprises said composing being responsive to said second detecting step.

5. The method of claim 3, further comprising:
- a verification step after said transmitting step, said verification step comprising verifying said registration information; and
- a receiving step after said verification step, said receiving step comprising another said computing device receiving said verified grade message.

6. The method of claim 5, further comprising:
- an encrypting step prior to said transmitting step; and
- a decrypting step between aid receiving step and said verification step.

7. A method of converting a conventional programmed computer comprising a processor, a standard operating system, further defined by standard kernels, daetnons at libraries, at least one data storage system, at least one input device, and at least on external network interface, the method comprising the steps of:
- copying a node control applications group comprising applications defined by executable statements to said data storage system of said programmed computers; and
- executing a node control application, said application a member of said group in said storage system of said programmed computer;
- composing a grade message in said programmed computer; and
- transmitting said grade message from said computer to another computer over a communications network,
- wherein none of said copying, executing, composing or transmitting steps modify or requite modification to said standard operating system.

8. The method of claim 7,
- further comprising a user input step prior to said composing step, said user input step comprising a user inputting family registration information to said programmed computer; and
- wherein said composing further comprises said composing being responsive to said family registration information.

9. The method of claim 8,
- further comprising the step of a first detecting prior to said composing, said first detecting comprising said programmed computer detecting the size of said storage system and the speed of said processor; and
- wherein said composing comprises composing a grade message responsive to said first detecting.

10. The method of claim 9,
- further comprising a second detecting step after said first detecting step, said second detecting comprising said computing device detecting the amount of available processing capacity remaining in said processor and the amount of available memory capacity remaining in said storage system; and
- wherein said composing further comprises said composing being responsive to said second detecting step.

11. The method of claim 10, further comprising encrypting step prior to said transmitting step.

12. A cluster computing system, comprising:
- a first communications network;
- a first computing device, said first computing device comprising at least one processor, a standard operating system having no specialized operating system components or features, at least one data storage system and at least one interface to said communications network;
- a second computing device, said second computing device comprising at least one processor, a standard operating system having no specialized operating system components or features, at least one data storage system and at least one interface to said communications network, said second computing device in communication with said first computing device over said communications network;
- a first cluster node control and interface application comprising executable statements being executed on said first computing device, said first cluster node control and interface application compatible with said standard operating system;
- a second cluster node control and interface application comprising executable statements being executed on said second computing device, said second cluster node control and interface application compatible with said standard operating system;
- wherein said first and second cluster node control interface applications exchange data messages, said data messages comprise encrypted registration information; and whereby said first and second node control interface applications cooperate to share said processors and said storage systems of said first and second computing devices.

13. The system of claim 12, wherein said data messages are substantially in TCP/IP format.

14. The system of claim 13, wherein said cooperation between said first and second node control interface applications comprises sharing said processors commencing with said first and second node control interface applications first discovering each other using standard operating system protocols.

15. The system of claim 14, wherein said discovering in said cooperation comprises execution of services location protocol.

* * * * *